United States Patent [19]

Kloft

[11] Patent Number: 4,977,708
[45] Date of Patent: Dec. 18, 1990

[54] PORTABLE HANDHELD TOOL MACHINE HAVING A TENSIONING DEVICE FOR A BELT DRIVE

[75] Inventor: Manfred Kloft, Waiblingen-Hegnach, Fed. Rep. of Germany

[73] Assignee: Andreas Stihl, Waihlingen, Fed. Rep. of Germany

[21] Appl. No.: 448,267

[22] Filed: Dec. 11, 1989

[30] Foreign Application Priority Data

Dec. 10, 1988 [DE] Fed. Rep. of Germany ....... 3841644

[51] Int. Cl.⁵ .................. B24B 23/00; B24B 21/20; F16H 7/12; F16H 7/22
[52] U.S. Cl. .................. 51/170 R; 51/148; 474/138; 474/117
[58] Field of Search .............. 51/148, 170 R, 170 PT, 51/170 EB, 170 T, 135 R; 474/136, 138, 135, 113, 117, 115; 83/818

[56] References Cited

U.S. PATENT DOCUMENTS

| | | | |
|---|---|---|---|
| 2,532,981 | 12/1950 | Wolfe | 51/148 X |
| 2,747,421 | 5/1956 | Thiel | 51/148 X |
| 3,606,707 | 9/1971 | Naslund | 51/170 R X |
| 4,335,542 | 6/1982 | Howe | 51/148 X |
| 4,754,579 | 7/1988 | Batt | 51/170 EB |

Primary Examiner—Frederick R. Schmidt
Assistant Examiner—Bruce P. Watson
Attorney, Agent, or Firm—Walter Ottesen

[57] ABSTRACT

The invention is directed to a tensioning device for a portable handheld tool machine such as a grinding machine or cutting and grinding machine. Such machines have an arm which includes two component sections axially displaceable toward each other and between which a belt tensioning device is mounted. The displaceable component must be displaced against the force of the tensioning device toward the component fixed on the housing of the machine when mounting a new belt. This is inconvenient and leads to difficulties when mounting a new belt. A setting device is provided which acts upon the belt tensioning device. The setting device is movable between first and second positions and blocks the tensioning force in its first position and releases the tensioning force in its second position.

11 Claims, 2 Drawing Sheets

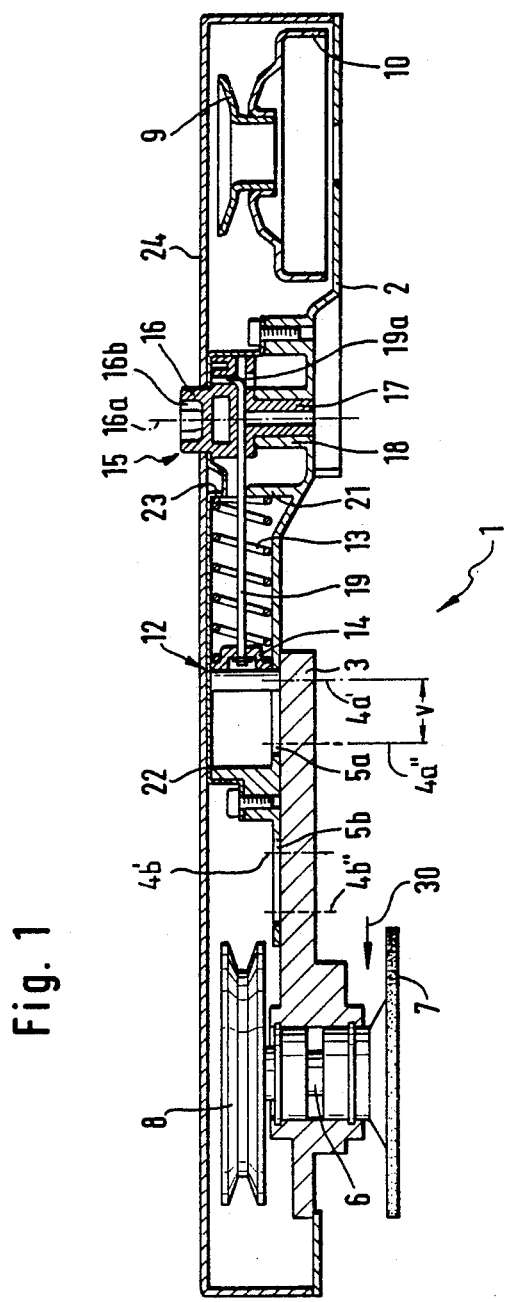

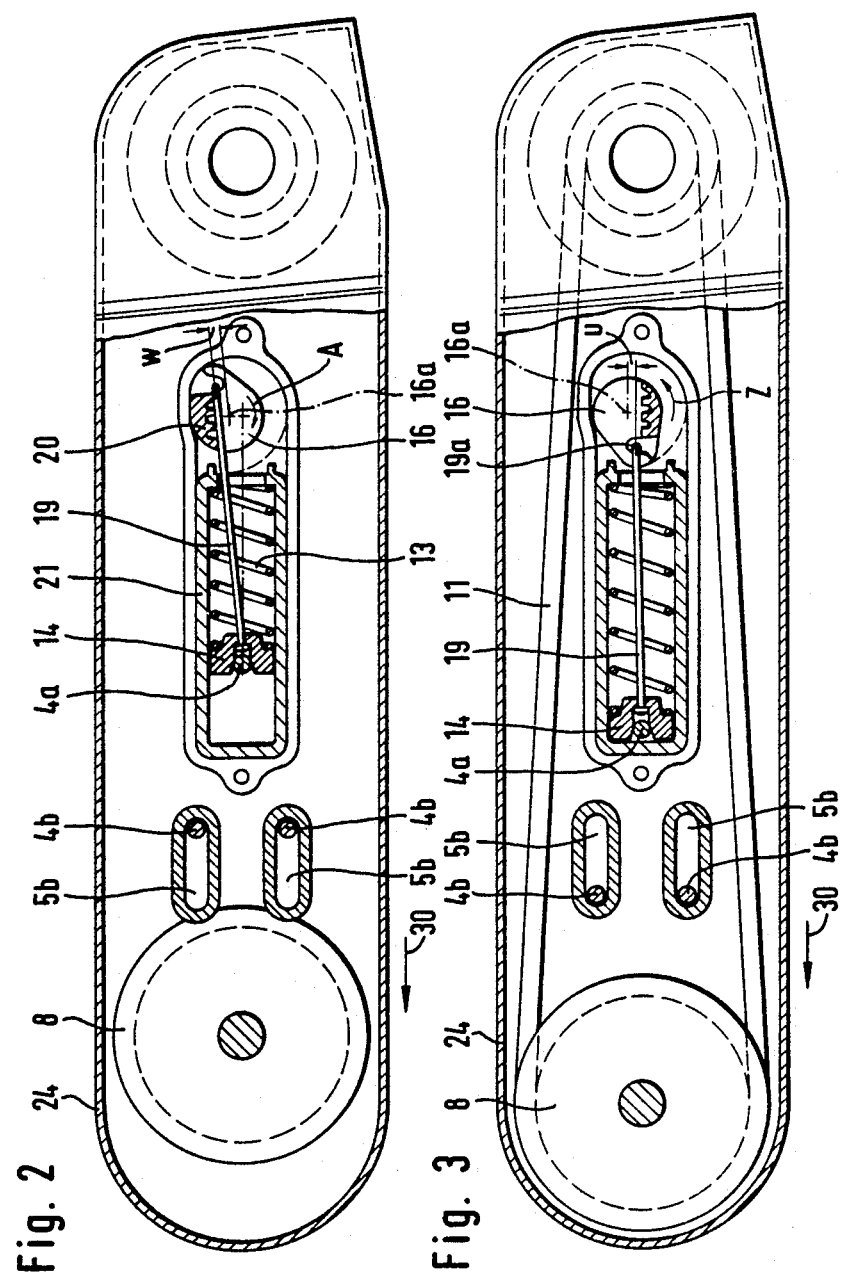

4,977,708

PORTABLE HANDHELD TOOL MACHINE HAVING A TENSIONING DEVICE FOR A BELT DRIVE

FIELD OF THE INVENTION

The invention relates to a portable handheld tool machine having a rotatively driven disc-shaped cutting tool such as a grinding machine or a cutoff and grinding machine. The machine rotatively drives a disc-shaped cutting or grinding tool via a belt drive and a tensioning device adjusts the tension of the drive belt.

BACKGROUND OF THE INVENTION

For cutoff and grinding machines of this kind, it is known to configure the arm out of two component sections movable toward each other in the longitudinal direction of the arm between which a belt tensioning device is arranged. The belt of the belt drive must be exchanged when the belt tensioning device has driven the arm sections apart to the maximum possible length of the arm. For this purpose, the user must press the arm together against the force of the tensioning device. This inconvenient and difficult measure considerably increases the difficulty of installing a new belt.

SUMMARY OF THE INVENTION

It is an object of the invention to provide a portable handheld tool machine wherein an exchange of a drive belt can be made without hindrance from the belt tensioning device.

The portable handheld tool machine of the invention is a grinding machine or cutting and grinding machine or the like for rotatively driving a disc-shaped cutting or grinding tool. The portable handheld tool machine includes: a housing; a first component defining a first longitudinal axis and having an output spindle rotatably mounted thereon for accommodating the tool; a second component defining a second longitudinal axis and being mounted on the housing; the first component being mounted on the second component to define an arm therewith extending axially in the direction of the axes and so as to be displaceable relative to the second component in the direction of the axes; the second component having a drive wheel rotatably mounted thereon; a belt arranged between the drive wheel and the output spindle for transmitting a belt drive force from the drive wheel to the output spindle for rotatively driving the tool; tensioning means for providing a tensioning force which acts on the components for adjusting the tension in the belt so as to permit a reliable transmission of the belt drive force to the output spindle; setting means operatively connected to the tensioning means and being movable between a first position for blocking the effect of the tensioning force and a second position for releasing the tensioning force to act between the components; and, clamping means for clamping the components so as to cause the components to be non-displaceable relative to each other.

The setting device is adjusted to its first position for installing the new belt. In this position, the action of the tensioning force on the displaceable component section of the arm is blocked and a new belt can be mounted quickly and without hindrance. As soon as the belt is mounted, the setting device is switched into its second position wherein the setting device releases the tensioning force of the belt tensioning device. The newly mounted belt is tensioned with a predetermined force so that, after the clamping arrangement is tightened, work with the handheld tool machine and an optimally tensioned belt drive is possible.

In an advantageous development of the invention, a rotary knob is provided as the setting device. For this rotary knob, a pull rod engages the tensioning device in the inactive position of the latter and the pull rod lies against a stop on the one side of the rotational axis of the rotary knob and, in the active position of the tensioning device, the pull rod lies on the other side of this rotational axis. This affords the advantage that the tensioning force of the tensioning device can be utilized to hold the pull rod against the stop under the action of the tensioning force.

In a preferred embodiment of the invention, the portion of the rotary knob accessible from the outside has a marking which is assigned to a marking on the housing of the arm. For example, both markings can overlap when the complete stroke of the tensioning device is reached. In this way, the user has the possibility to visually determine at any time whether the mounted belt of the belt drive is to be soon exchanged or not. From the spacing of the two markings with respect to each other, the user is at any time informed about the tension path still available and so can timely exchange a belt which is no longer useable.

BRIEF DESCRIPTION OF THE DRAWINGS

The invention will now be described with reference to the drawings wherein:

FIG. 1 is a longitudinal section through the arm of a cutoff and grinding machine;

FIG. 2 is a side view, partially in section, of an arm according to FIG. 1 with the drive belt not shown; and, FIG. 3 is a view corresponding to FIG. 2 with the drive belt shown.

DESCRIPTION OF THE PREFERRED EMBODIMENTS OF THE INVENTION

The arm illustrated in the embodiment is part of a handheld tool machine having a rotatively driven disc-shaped cutting tool, especially a grinding machine or a cutoff and grinding machine. The arm 1 includes two component sections 2 and 3 displaceable toward each other which can be rigidly connected to each other via clamping screws 4a and 4b. The clamping screws 4a and 4b lie spaced to each other in the longitudinal direction of the arm 1 and extend through slots 5a and 5b arranged in the component section 2. The slots 5a and 5b extend in the longitudinal direction of the arm 1. The screws 4a and 4b engage in clamping plates (not shown) which can be arranged on the housing side of the component section 2 facing away from component section 3.

A spindle 6 is journalled in the first component section 3 of the arm 1. The spindle 6 carries a disc-shaped cutting tool at one end and a belt pulley 8 at the other end.

The second component section 2 of the arm 1 is tightly fixed to the housing via attachment mean not shown in greater detail, for example on the motor housing of the drive motor of the cutoff and grinding machine. The drive wheel 9 is likewise configured as a belt pulley in the illustrated embodiment and is connected via a clutch drum 10 to a corresponding counterpiece on the motor drive shaft. The belt pulleys 8 and 9 lie in alignment to each other on one side of the arm 1. A drive belt 11 is guided over the belt pulleys 8 and 9 (FIG. 3).

A belt tensioning device 12 is integrated into the second component section 2 of the arm 1. The belt tensioning device consists essentially of a helical spring 13 braced on the housing of the second component section 2 and this spring acts upon the bolt-like clamping screw 4a via a pressure piece 14. When the clamping screws 4a and 4b are loosened, the force of the spring 13 acts as tensioning force on the component section 3 of the arm 1 and strives to axially displace the component section 3 in the direction of arrow 30 in the longitudinal direction of the arm 1. Accordingly, when the clamping screws 4a and 4b are loosened, the drive belt 11 mounted on the belt pulleys 8 and 9 is tensioned with a predetermined tensioning force. Before working with the cutoff and grinding machine, the clamping screws 4a and 4b are tightened in order to achieve a rigid, force-transmitting connection between the component sections 2 and 3.

The slots 5a and 5b determine the maximum displacement path (v) of the tensioning device. The screws 4a and 4b lie at the location shown in FIG. 1 in the starting positions 4a' and 4b', respectively. At the end of the displacement path, the screws 4a and 4b lie in the positions 4a'' and 4b'', respectively.

The belt tensioning device 12 is coupled with a setting device 15 which acts on the tensioning device 12 for compensating the tensioning force acting in the direction of arrow 30. In the embodiment shown, this setting device 15 consists, for example, of a rotary knob 16 which extends with an axially extending bearing section 17 and is rotatably held therewith in a correspondingly configured bearing seat 18 in the housing of component section 2. The rotary knob 16 is disposed with its longitudinal axis perpendicularly on the component section 2. The setting device 15 and the tensioning device 12 lie within the belt loop one behind the other in the longitudinal direction of the arm 1 as shown in the plan view according to FIG. 3.

The end of the pull rod 19 is pivotally connected to a rotary knob 16 with spacing to the rotational axis 16a. The other end of the pull rod 19 is fixed at the pressure piece 14. The pull rod 19 extends in the longitudinal direction of the arm 1. The connection of the pull rod 19 at the pressure piece 14 permits limited pivotal movement but is preferably axially fixed.

As can be seen from FIG. 3, the screws 4b lie at the forward end of the slots 5b when the component section 3 is fully extended in the direction of arrow 30 by the tensioning device 12. In this position, the pull rod 19 lies at a lateral distance (u) to the rotational axis 16a. If the setting knob 16 configured as a rotary knob is rotated in the direction of arrow Z about the rotational axis 16a, the pivoted end 19a of the push rod 19 pivots in the sense of increasing the spacing (u) downwardly and then with further rotation in the sense of reducing the distance (u), the push rod 19 is again moved upwardly. With a further rotation, the push rod 19 passes over the rotational axis 16a and lies against a stop 20 which is arranged on the rotary knob 16 in the illustrated embodiment (FIG. 2). In this position of the stop 20, the push rod 19 is spaced a distance (w) to the rotational axis 16a with the point of engagement of the end 19a on the rotary knob 16 being displaced from the one side of the rotational axis 16a as shown in FIG. 3 to the other side of the rotational axis 16a as shown in FIG. 2. This results in the tensioning force of the spring 13 first acting in the direction of arrow 30 against the arrow direction Z as long as the pull rod end 19a lies on the side of the rotational axis 16a shown in FIG. 3. When the push rod end 19a passes over the rotational axis 16a, the tensioning force of the spring 13 acting in the direction of arrow 30 supports the rotational movement in the arrow direction Z, so that the push rod 19 is held latched on the stop 20 by the tensioning force of the spring 13.

By rotating the setting knob 16 about approximately 180° in the arrow direction Z, the pressure piece 14 is pushed back via the push rod 19 from its forwardmost stop position (FIG. 3) opposite arrow direction 30 against the force of spring 13 into an inactive position (FIG. 2). If the clamping screws 4b are released in this inactive position, the first component section 3 can be displaced opposite arrow direction 30 toward the second component section 2 in order, for example, to mount a new belt 11. When the new belt is mounted, the rotary knob 16 is pivoted back in the arrow direction A (FIG. 2) with the push rod being moved forwardly in arrow direction 30 via the pressure piece 14 under the action of spring 13 after passing over the rotational axis 16a. The displacement of the first component section 3 of the arm 1 in the arrow direction 30 via the clamping screw 4a continues until the newly mounted belt 11 is taut and is subjected to a tensioning force determined by the force of spring 13. In this position, the clamping screws 4a and 4b are again tightened and the component sections 2 and 3 are connected to each other to form a rigid, force-transmitting arm 1.

The housing seat 21 is formed as one piece on the component section 2 and accommodates the helical spring 13 and the pressure piece 14 of the tensioning device 12. In a preferred development, the housing seat 21 is covered by a closure plate 22 held with screws with the closure plate 22 covering the parts of the setting device 15. In this way, the setting device is reliably protected against the penetration of dirt and the like in the same manner as the tensioning device.

In order to provide a support of the helical spring 13 extending along the entire periphery of the spring 13, the closure plate 22 includes an impressed crease 23 on which the last turn of the helical spring is braced.

In addition, the rotary knob 16 is axially secured in its seated position in the component section 2 by means of the closure plate 22. For this purpose, the closure plate 22 extends over a small annular section on the rotary knob 16.

A protective hood 24 is provided and extends over the entire length and width of the arm 1 and covers the belt drive as well as the tensioning device and the setting device.

As seen from FIG. 1, the holding end of the rotary knob 16 extends beyond the protective hood 24 and has an insert 16b for a tool such as an allen wrench so that an adequate lever arm is provided for the user for overcoming the tensioning force of the belt tensioning device 12.

In an advantageous development of the invention, the rotary knob 16 has a notch, colored marking or the like on its section extending out from the protective hood 24. This notch, colored marking or the like lies in alignment with a corresponding marking on the protective hood 24, for example, in the end position of the belt tensioning device 12 according to FIG. 3. In this way, the user can always determine during operation of the handheld tool machine what tightening distance is still available. The necessary exchange of the mounted belt 11 can be recognized early in this manner.

It is understood that the foregoing description is that of the preferred embodiments of the invention and that various changes and modifications may be made thereto without departing from the spirit and scope of the invention as defined in the appended claims.

What is claimed is:

1. A portable handheld tool machine such as a grinding machine or cutting and grinding machine for rotatively driving a disc-shaped cutting or grinding tool, the portable handheld tool machine comprising:

a housing;

a first component defining a first longitudinal axis and having an output spindle rotatably mounted thereon for accommodating the tool;

a second component defining a second longitudinal axis and being mounted on said housing;

said first component being mounted on said second component to define an arm therewith extending axially in the direction of said axes and so as to be displaceable relative to said second component in the direction of said axes;

said second component having a drive wheel rotatably mounted thereon;

a belt arranged between said drive wheel and said output spindle for transmitting a belt drive force from said drive wheel to said output spindle for rotatively driving the tool;

tensioning means for providing a tensioning force which acts on said components for adjusting the tension in said belt so as to permit a reliable transmission of said belt drive force to said output spindle;

said tensioning means including: a pressure piece for imparting said tensioning force to said first component; and, resilient biasing means for providing said tensioning force between said second component and said pressure piece;

setting means operatively connected to said tensioning means and including: a rotary knob defining a rotational axis and being rotatably journalled in said second component; and, a pull rod for connecting said rotary knob to said pressure piece;

said rotary knob being rotatable between a first rotational position wherein said knob acts on said pressure piece via said pull rod to hold said pressure piece in an inactive position wherein said tensioning force of said resilient biasing means is blocked from acting on said first component and a second rotational position wherein said knob acts via said pull rod on said pressure piece for releasing said pressure piece into an active position wherein said resilient biasing means acts through said pressure piece to impart said tensioning force to said first component;

said pull rod being connected to said rotary knob so as to cause said pull rod to lie on one side of said rotational axis when said pressure piece is in said inactive position and so as to cause said pull rod to lie on the other side of said rotational axis when said pressure piece is in said active position; and, stop means for holding said pull rod on said one side of said rotational axis under the force of said resilient biasing means when said pull rod is on said one side of said rotational axis.

2. The portable handheld tool machine of claim 1, said pressure piece being slideably mounted in said second component so as to permit movement of said pressure piece through a stroke (v) into said inactive position.

3. The portable handheld tool machine of claim 1, said tensioning means including a seat formed on said second component; and, said resilient biasing means being disposed between said pressure piece and said seat for applying said tensioning force therebetween.

4. The portable handheld tool machine of claim 3, said second component including a closure plate for covering said seat and said resilient biasing means for preventing dirt from reaching said seat and said resilient biasing means.

5. The portable handheld tool machine of claim 4, said resilient biasing means being a helical spring defining a longitudinally extending spring axis; said spring being supported at respective ends thereof in the direction of said spring axis between said pressure piece and said seat; and, said closure plate having a crease formed therein so as to provide an additional seat for supporting said helical spring.

6. The portable handheld tool machine of claim 1, said setting means and said tensioning means being mounted in said arm so as to be disposed one behind the other in the direction of said axes.

7. The portable handheld tool machine of claim 6, said belt defining a loop and said setting means and tensioning means being disposed within said loop.

8. The portable handheld tool machine of claim 1, said second component including a closure plate for covering said tensioning means; and, said rotary knob having a knob and a shaft extending from said knob, said shaft being rotatably journalled in said second part and said rotary knob having a collar formed on said shaft; and, said closure plate having an opening formed therein so as to permit said plate to receive said knob therein and axially secure said rotary knob at said collar.

9. The portable handheld tool machine of claim 8, said knob having hand tool receiving means formed thereon so as to permit an operator of the machine to rotate said rotary knob with a hand tool.

10. The portable handheld tool machine of claim 8, said knob having first marking means formed thereon and said closure plate having second marking means formed thereon so as to permit said first and second marking means to conjointly provide a visual indication of the position of said pressure piece within said stroke (v) when said pressure piece is in the active position.

11. The portable handheld tool machine of claim 1, said stop means being a stop formed on said rotary knob for receiving said pull rod thereagainst under the force of said resilient biasing means when said pull rod is on said one side of said rotational axis whereby said resilient biasing means applies a torque to said rotary knob for holding said pull rod against said stop.

* * * * *